United States Patent
Hattori et al.

(10) Patent No.: US 10,547,225 B2
(45) Date of Patent: Jan. 28, 2020

(54) METHOD FOR PRODUCING AN ELECTRIC MOTOR WITH STATOR HAVING STEP-SHAPED STATOR TEETH

(71) Applicant: MITSUBISHI HEAVY INDUSTRIES THERMAL SYSTEMS, LTD., Tokyo (JP)

(72) Inventors: Makoto Hattori, Tokyo (JP); Masahiko Asai, Tokyo (JP); Kazuki Niwa, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 16/214,540

(22) Filed: Dec. 10, 2018

(65) Prior Publication Data

US 2019/0181711 A1  Jun. 13, 2019

Related U.S. Application Data

(63) Continuation of application No. 14/394,776, filed as application No. PCT/JP2013/061895 on Apr. 23, 2013.

(30) Foreign Application Priority Data

Jul. 4, 2012  (JP) .................................. 2012-150640

(51) Int. Cl.
*H02K 3/34* (2006.01)
*H02K 1/14* (2006.01)
(Continued)

(52) U.S. Cl.
CPC ............. *H02K 3/345* (2013.01); *H02K 1/146* (2013.01); *H02K 1/185* (2013.01); *H02K 3/48* (2013.01);
(Continued)

(58) Field of Classification Search
CPC ............ H02K 3/32; H02K 3/34; H02K 3/345; H02K 3/48; H02K 3/487; H02K 3/46;
(Continued)

(56) References Cited

U.S. PATENT DOCUMENTS

| 4,380,713 | A | * | 4/1983 | Roger | ...................... | H02K 3/47 |
| | | | | | | 29/596 |
| 5,477,096 | A | * | 12/1995 | Sakashita | ................. | H02K 1/06 |
| | | | | | | 310/216.016 |

(Continued)

FOREIGN PATENT DOCUMENTS

| CN | 1567679 A | 1/2005 |
| CN | 101523696 A | 9/2009 |

(Continued)

OTHER PUBLICATIONS

Chinese Office Action and Search Report, dated Mar. 30, 2016, for Chinese Application No. 201380021267.2, together with an English translation thereof.

(Continued)

*Primary Examiner* — Mang Tin Bik Lian
*Assistant Examiner* — Maged M Almawri
(74) *Attorney, Agent, or Firm* — Birch, Stewart, Kolasch & Birch, LLP

(57) ABSTRACT

A method for producing an electric motor provided with a stator core configured by laminating a required number of annular electromagnetic steel sheets having a plurality of tooth portions on an inner periphery thereof. The circumferential widths of the tooth portions become gradually narrower in a stepwise fashion toward an uppermost surface and an undermost surface of the plurality of laminated electromagnetic steel sheets, whereby the shoulder portions on both sides in a circumferential direction of the tooth portions smoothly change. A flexible, planar insulating (Continued)

member is provided having a first portion of a shape similar to a planar shape of said electromagnetic steel sheet, and further comprising flexible ear portions at positions corresponding to shoulder portions on both sides in a circumferential direction of the tooth portions. A coil is wound around the flexible planar insulating member and the respective tooth portions, including the ear portions of said insulating member interposed between the coil winding and the tooth portion, to thereby deform the flexible ear portions to conform the shape of the shoulder portions.

4 Claims, 4 Drawing Sheets

(51) Int. Cl.
H02K 1/18 (2006.01)
H02K 3/48 (2006.01)
H02K 21/16 (2006.01)

(52) U.S. Cl.
CPC ......... H02K 21/16 (2013.01); H02K 2213/03 (2013.01)

(58) Field of Classification Search
CPC ........ H02K 3/349; H02K 1/146; H02K 1/185; H02K 21/16; H02K 2213/03; H02K 2203/12
USPC ....... 310/215, 216.115, 216.105, 216.61, 43, 310/194, 214, 216.023, 216.011, 216.018, 310/216.019, 216.216, 216.061; 29/596
See application file for complete search history.

(56) References Cited

U.S. PATENT DOCUMENTS

| 5,895,994 | A * | 4/1999 | Molnar | H02K 1/165 |
| | | | | 310/194 |
| 6,072,259 | A * | 6/2000 | Kawabata | H02K 3/38 |
| | | | | 310/216.049 |
| 6,897,592 | B2 * | 5/2005 | Suzuki | H02K 3/525 |
| | | | | 310/194 |
| 7,667,367 | B2 * | 2/2010 | Matsuo | H02K 1/148 |
| | | | | 310/216.008 |
| 8,816,558 | B2 * | 8/2014 | Sears | H02K 3/522 |
| | | | | 310/194 |
| 9,331,530 | B2 * | 5/2016 | Jang | H02K 1/146 |
| 2003/0062795 | A1 * | 4/2003 | Otsuki | H02K 1/148 |
| | | | | 310/208 |
| 2004/0056557 | A1 * | 3/2004 | Enomoto | H02K 1/148 |
| | | | | 310/216.061 |
| 2005/0067914 | A1 * | 3/2005 | Baba | H02K 1/146 |
| | | | | 310/153 |
| 2006/0022545 | A1 * | 2/2006 | Hashiba | H02K 21/222 |
| | | | | 310/179 |
| 2006/0043798 | A1 * | 3/2006 | Konno | H02K 1/141 |
| | | | | 310/12.07 |
| 2007/0194653 | A1 * | 8/2007 | Prokscha | H02K 3/522 |
| | | | | 310/216.023 |
| 2008/0100171 | A1 * | 5/2008 | Nakajima | G11B 19/2009 |
| | | | | 310/254.1 |
| 2008/0307634 | A1 * | 12/2008 | Nishizawa | B21D 28/22 |
| | | | | 29/596 |
| 2009/0026873 | A1 * | 1/2009 | Matsuo | H02K 1/148 |
| | | | | 310/216.009 |
| 2009/0324435 | A1 * | 12/2009 | Sears | H02K 3/522 |
| | | | | 417/423.7 |
| 2012/0080973 | A1 * | 4/2012 | Furukawa | H02K 1/24 |
| | | | | 310/195 |
| 2013/0154435 | A1 * | 6/2013 | Nakatake | H02K 1/146 |
| | | | | 310/216.061 |

FOREIGN PATENT DOCUMENTS

| JP | 8-275423 A | 10/1996 |
| JP | 2001-178031 A | 6/2001 |
| JP | 2004-135382 A | 4/2004 |
| JP | 2004-242443 A | 8/2004 |
| JP | 2004-248440 A | 9/2004 |
| JP | 2005-45884 A | 2/2005 |
| JP | 2005-95000 A | 4/2005 |
| JP | 2007-215335 A | 8/2007 |
| JP | 2008-206322 A | 9/2008 |
| JP | 2010-130842 A | 6/2010 |
| JP | 4788881 B2 | 10/2011 |

OTHER PUBLICATIONS

Chinese Office Action dated Nov. 23, 2016 in corresponding Chinese Patent Application No. 201380021267.2 with an English Translation.

* cited by examiner

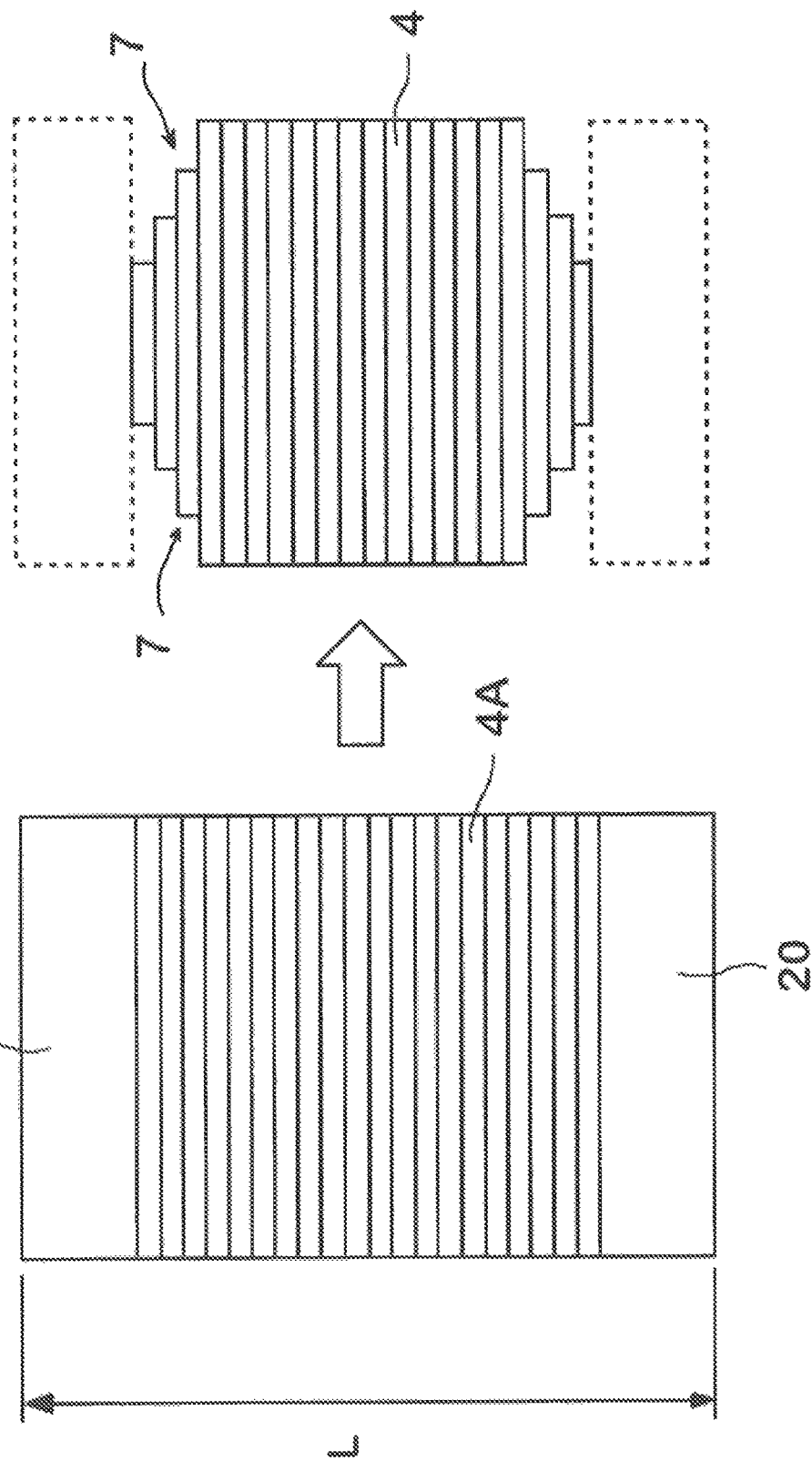

METHOD FOR PRODUCING AN ELECTRIC MOTOR WITH STATOR HAVING STEP-SHAPED STATOR TEETH

This application is a Continuation of copending application Ser. No. 14/394,776, filed on Oct. 16, 2014, which is the National Phase under 35 U.S.C. § 371 of International Application No. PCT/JP2013/061895, filed on Apr. 23, 2013, which claims the benefit under 35 U.S.C. § 119(a) to Patent Application No. 2012-150640, filed in Japan on Jul. 4, 2012, all of which are hereby expressly incorporated by reference into the present application.

TECHNICAL FIELD

The present invention relates to an electric motor in which it is possible to attain a reduction in size by making the axial dimension of a stator small.

BACKGROUND ART

A direct winding motor is used in an electric motor for a compressor which is applied to a refrigerant compressor of an in-car air conditioner. In the direct winding motor, coil bobbins having insulation properties are installed at tooth portions around which a coil winding is wound, on both end sites of a stator core which is configured by laminating a required number of electromagnetic steel sheets generally shaped by punching, and the coil winding is then wound (refer to, for example, PTL 1).

On the other hand, PTL 2 discloses a stator of an electric motor in which a stator core is configured to be divided into a plurality of split core bodies a, in each of which a tooth portion and a yoke portion are integrally formed, and a plurality of split core bodies b each forming a yoke portion which is pinched by the split core bodies a, and a coil winding is directly wound around the tooth portion of the split core body a without mounting a winding guide (a coil bobbin).

CITATION LIST

Patent Literature

[PTL 1] Japanese Patent No. 4788881
[PTL 2] Japanese Unexamined Patent Application Publication No. 2005-95000

SUMMARY OF INVENTION

Technical Problem

However, in the case of the motor in which the coil bobbins are installed at both end sites of the stator core, as shown in PTL 1, since the coil bobbin itself has a thickness dimension, the axial dimension of a stator increases by an amount equivalent to the thickness dimension, thereby causing one of factors in an increase in the size of the motor. For this reason, in the motor having the coil bobbin, as an electric motor for a compressor in which an improvement in the ability to be mounted on a vehicle by a reduction in size is required, the request cannot be sufficiently satisfied.

On the other hand, in a structure rendering coil bobbinless, as shown in PTL 2, the axial dimension of a stator is reduced by an amount corresponding to the thickness dimension of a coil bobbin, and thus it is considered that it is possible to reduce the size of the motor. However, in a structure rendering only coil bobbin-less, there is a concern that a problem such as coating damage or disconnection of the coil winding may occur at the time of winding due to edges which are formed at shoulder portions on both sides in a circumferential direction of the tooth portion around which the coil winding is wound, of the stator core which is configured by laminating the electromagnetic steel sheets shaped by punching, and thus there is a case where the quality of the coil winding cannot be secured.

The present invention has been made in view of such circumstances and has an object to provide an electric motor in which even if coil bobbin-less is rendered, coating damage, disconnection, or the like of a coil winding by a shoulder portion edge of a tooth portion is prevented, and thus it is possible to wind the coil winding while securing the quality thereof.

Solution to Problem

In order to solve the above-described problem, an electric motor according to the present invention adopts the following means.

That is, according to a first aspect of the present invention, there is provided an electric motor including: a stator core configured by laminating a required number of annular electromagnetic steel sheets having a plurality of tooth portions around each of which a coil winding is wound, on an inner periphery side, wherein circumferential widths of the tooth portion in the plurality of electromagnetic steel sheets which are laminated on both end sides of the stator core become gradually narrow toward the respective end portion sides, and the coil winding is directly wound around the tooth portion in which shoulder portions on both sides in a circumferential direction of the tooth portion which is formed by lamination of the electromagnetic steel sheets are shoulder portions which smoothly change so as to narrow in width in a stepwise fashion toward the respective end portions.

According to the electric motor related to the first aspect of the present invention, the circumferential widths of the tooth portion in the plurality of electromagnetic steel sheets which are laminated on both end sides of the stator core having a laminated structure become gradually narrow toward the respective end portion sides and the coil winding is directly wound around the tooth portion in which shoulder portions on both sides in a circumferential direction of the tooth portion which is formed by lamination of the electromagnetic steel sheets are shoulder portions which smoothly change so as to narrow in width in a stepwise fashion toward the respective end portions, and therefore, even in a configuration in which coil bobbin-less is rendered, and thus the coil winding is directly wound around the tooth portion in the electromagnetic steel sheets, since the shoulder portions on both sides in the circumferential direction of the tooth portion are shoulder portions which smoothly change so as to narrow in width in a stepwise fashion toward the end portions and have a shape along a winding shape of the coil winding, coating damage, disconnection, or the like of the coil winding by a shoulder portion edge of the tooth portion is prevented, and thus it is possible to wind the coil winding while securing the quality thereof. Therefore, the axial dimension of a stator is reduced by an amount equivalent to the thickness of a coil bobbin, and thus it is possible to reduce the thickness of the motor. Further, due to rendering coil bobbin-less, it is possible to attain the simplification of a configuration and cost reduction, and it is possible to attain improvement in efficiency due to a reduction in the wire length of the coil winding, improvement in reliability due to contact relaxation between the coil winding and the stator core, or the like.

Further, according to a second aspect of the present invention, in the electric motor described above, the coil winding is wound around the tooth portion with a thin insulating member having a shape along the shoulder portion interposed therebetween.

According to the electric motor related to the second aspect of the present invention, the coil winding is wound around the tooth portion with the thin insulating member having a shape along the shoulder portion interposed therebetween, and therefore, even in a case where due to rendering coil bobbin-less, a reduction in insulation properties between the coil winding and the stator core is of a concern and the amount of reduction exceeds a defined value, it is possible to cope with it by winding the coil winding with the interposition of the thin insulating members having a shape along the shoulder portion. Therefore, it is possible to attain the above-described effect by rendering coil bobbin-less.

Further, according to a third aspect of the present invention, in the electric motor described above, the insulating member has an ear portion which can be deformed along a shape of the shoulder portion of the tooth portion.

According to the electric motor related to the third aspect of the present invention, the insulating member has the ear portion which can be deformed along the shape of the shoulder portion of the tooth portion, and therefore, even in a case of winding the coil winding with the interposition of the insulating member, it is possible to wind the coil winding around the tooth portion with the insulating member interposed therebetween, while deforming the ear portion provided at the insulating member so as to follow the shape of the shoulder portion of the tooth portion. Therefore, it is possible to wind the coil winding while securing the quality so as to follow the shape of the shoulder portion of the tooth portion, regardless of the presence or absence of the insulating member.

Further, according to a fourth aspect of the present invention, in any one of the electric motors described above, the insulating member is configured with an insulating sheet having flexibility and having a shape similar to a planar shape of the electromagnetic steel sheet.

According to the electric motor related to the fourth aspect of the present invention, the insulating member is configured with the insulating sheet having flexibility and having a shape similar to the planar shape of the electromagnetic steel sheet, and therefore, when winding the coil winding with the interposition of the insulating member, by laminating the insulating sheets having a similar shape to the electromagnetic steel sheet on both ends of the stator core and winding the coil winding thereon, it is possible to wind the coil winding so as to follow the shape of the shoulder portion of the tooth portion while bending and deforming the insulating sheets having flexibility so as to follow the shape of the shoulder portion of the tooth portion. Therefore, it is possible to reliably wind the coil winding while securing the quality thereof, without impairing the workability of winding work of the coil winding.

Advantageous Effects of Invention

According to the present invention, even in a configuration in which coil bobbin-less is rendered, and thus the coil winding is directly wound around the tooth portion in the electromagnetic steel sheets, since the shoulder portions on both sides in the circumferential direction of the tooth portion are shoulder portions which smoothly change so as to narrow in width in a stepwise fashion toward the end portions and have a shape along a winding shape of the coil winding, coating damage, disconnection, or the like of the coil winding by a shoulder portion edge of the tooth portion is prevented, and thus it is possible to wind the coil winding while securing the quality thereof. For this reason, the axial dimension of the stator is reduced by an amount equivalent to the thickness of the coil bobbin, and thus it is possible to reduce the thickness of the motor. Further, due to rendering coil bobbin-less, it is possible to attain the simplification of a configuration and cost reduction, and it is possible to attain improvement in efficiency due to a reduction in the wire length of the coil winding, improvement in reliability due to contact relaxation between the coil winding and the stator core, or the like.

BRIEF DESCRIPTION OF DRAWINGS

FIG. 6A is a schematic diagram of an embodiment in which a coil bobbin is used; and FIG. 6B is a schematic diagram of an embodiment in which coil bobbin-less is rendered according to the change of the tooth portion.

DESCRIPTION OF EMBODIMENTS

Hereinafter, an embodiment of the present invention will be described with reference to FIGS. 1 to 6.

Figure 1:
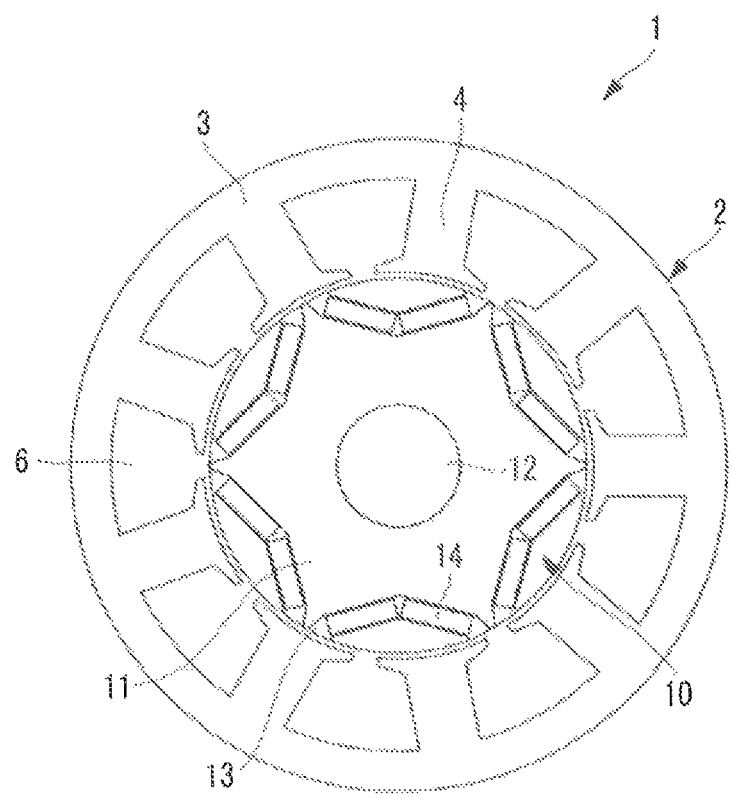
FIG. 1 is a plan view of an electric motor according to an embodiment of the present invention in a state where a coil winding is omitted.

In FIG. 1, a plan view of an electric motor according to an embodiment of the present invention in a state where a coil winding is omitted is shown.

An electric motor 1 is configured to include a stator 2 which is configured by winding a coil winding (not shown) around a tooth portion 4 of a stator core 3 having an annular shape, and a rotor 10 which is rotatably disposed inside the stator 2 with a predetermined gap interposed therebetween.

The rotor 10 has a cylindrical rotor core 11 which is configured by laminating a required number of thin electromagnetic steel sheets shaped by punching, and a through-hole 12 into which a rotating shaft (not shown) is fitted is axially bored in a central portion thereof. In the rotor core 11, holes for magnet embedment 13 in a number corresponding to the number of poles (in this embodiment, six poles) of a motor are provided so as to surround the through-hole 12 along an outer peripheral site thereof, and a configuration is made in which a permanent magnet 14 is embedded in each of the holes 13.

The stator core 3 configuring the stator 2 is configured by laminating a required number of electromagnetic steel sheets 5 shaped in an annular shape by punching, and the tooth portion 4 for winding a coil winding therearound is provided on the inner periphery side thereof. In the case of this embodiment, the tooth portions 4 are provided at nine places at substantially equal intervals on the inner periphery side of the stator core 3, and a slot 6 is punched between the respective tooth portions 4, whereby the coil winding can be wound around the tooth portion 4. In the case of this embodiment, a configuration is made in which coil windings of three phases, a U-phase, a V-phase, and a W-phase, are sequentially wound at three places.

Figure 2:
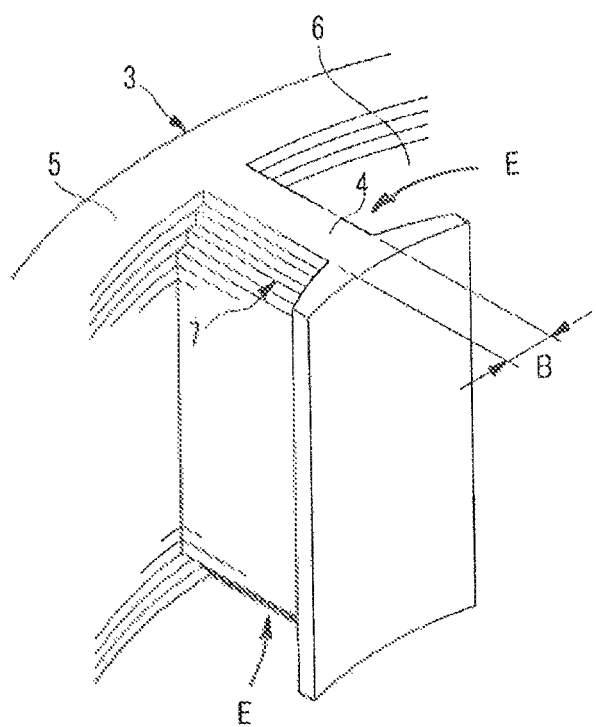
FIG. 2 is a perspective view of a tooth portion of a stator core of the electric motor shown in FIG. 1.
Figure 3:
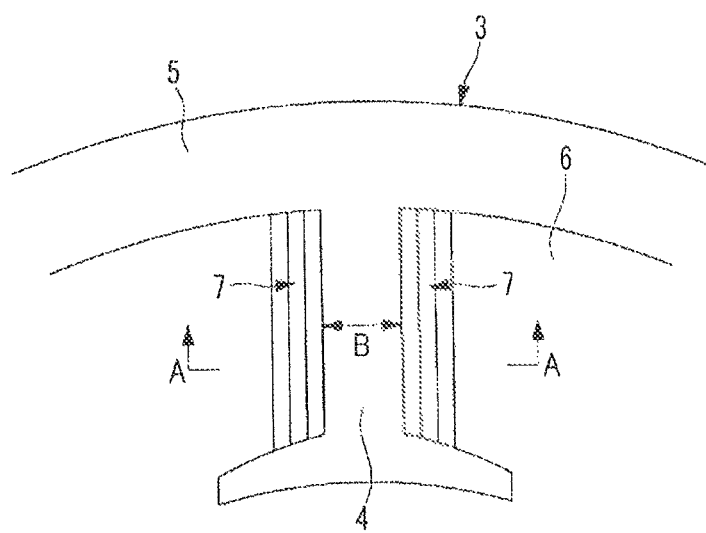
FIG. 3 is a plan view of the tooth portion of the stator core shown in FIG. 2.
Figure 4:
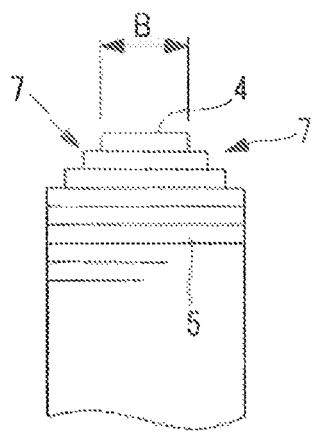
FIG. 4 is a diagram equivalent to the cross-section along line A-A of FIG. 3.

The tooth portion 4 is configured such that circumferential widths B of the tooth portion 4 in the plurality of electromagnetic steel sheets 5 which are laminated on both end sides of the stator core 3 are shaped by punching such that the widths B become gradually narrow toward the respective end portion sides E, and shoulder portions 7 which are formed on both sides in a circumferential direction of the tooth portion 4 on both end sides of the stator core 3 when the electromagnetic steel sheets 5 are laminated form the shoulder portions 7 which smoothly change so as to narrow in width in a stepwise fashion toward the respective end portions, as shown in FIGS. 2 to 4.

As described above, a configuration is made in which the shoulder portions 7 which are formed on both sides in the circumferential direction of the tooth portion 4 around which the coil winding of the stator core 3 is wound form the shoulder portions 7 which smoothly change so as to narrow in width in a stepwise fashion toward the respective end portions, on both end portion sides of the stator core 3. In this manner, even if coil bobbin-less is rendered, and thus the coil winding is directly wound around the tooth portion 4, the shoulder portions 7 of the tooth portion 4 have a smooth shape along a winding shape of the coil winding. For this reason, the coil winding is not subjected to coating damage or disconnection by a shoulder portion edge of the tooth portion 4, and thus it is possible to wind the coil winding while securing the quality thereof.

For this reason, an axial dimension of the stator 2 is reduced by an amount equivalent to the thickness of a coil bobbin which generally is a resin molded product and in which a central portion is thick compared to both side portions, and thus it is possible to make the motor thinner. Further, due to rendering coil bobbin-less, it is possible to attain the simplification of a configuration and cost reduction, and it is possible to attain improvement in efficiency due to a reduction in the wire length of the coil winding, improvement in reliability due to contact relaxation between the coil winding and the stator core 3, or the like.

A schematic diagram in which a structure in a case FIG. 6A where a coil bobbin is used is compared with a structure in a case FIG. 6B in which coil bobbin-less is rendered according to the change of the tooth portion 4 is shown.

In a case where a coil winding is wound around a tooth portion 4A with a coil bobbin 20 interposed therebetween, an axial dimension L of the stator 2 which includes the coil winding is increased by an amount equivalent to the thickness of the coil bobbin 20. In contrast, by making the shoulder portions 7 on both sides in the circumferential direction of the tooth portion 4 be the shoulder portions 7 which smoothly change so as to narrow in width in a stepwise fashion toward the end portion side, and directly winding the coil winding, thereby omitting the coil bobbin 20, it is possible to shorten the dimension L by at least an amount equivalent to the thickness of the coil bobbin 20. For this reason, it is possible to expect the effects such as the thinning of the motor, the simplification of a configuration, cost reduction, and improvement in efficiency due to a reduction in winding wire length.

On the other hand, as described above, in a case where insulation performance between the stator core 3 and the coil winding is reduced due to rendering coil bobbin-less and the amount of reduction exceeds a defined value, thin insulating members 8 may be disposed at both ends of the tooth portion 4 of the stator core 3. As the insulating member 8, it is possible to use an insulating sheet, an insulative film, or a molded product by vacuum molding, injection molding, or the like. However, in order to attain the effect by rendering coil bobbin-less, it is preferable to make the thickness of the insulating member 8 be less than or equal to 1 mm.

Figure 5:
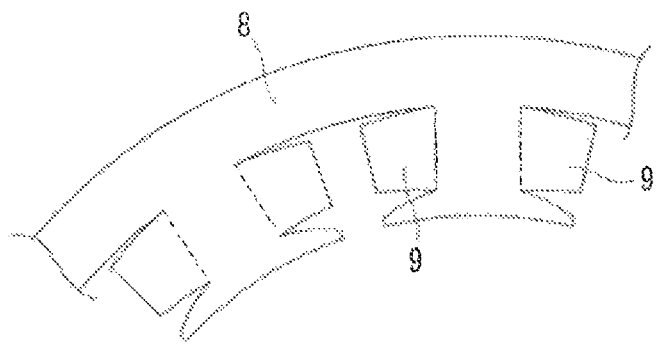
FIG. 5 is a partial plan view of an insulating sheet which is used in a case where insufficient insulation is of a concern.

In FIG. 5, an example in which an insulating sheet having flexibility and having a planar shape similar to the shape of the electromagnetic steel sheet 5 shaped in an annular shape by punching is used as the insulating member 8 is shown. In the case of the insulating sheet 8, the insulating sheets are used to be laminated on both end surfaces of the stator core 3. However, a configuration is adopted in which car portion 9 having an appropriate length are provided at positions corresponding to the shoulder portions 7 so as to be deformed along the smooth shoulder portions 7 on both sides in the circumferential direction of the tooth portion 4.

In this manner, in a case where a reduction in insulation properties between the coil winding and the stator core 3 is of a concern, it is possible to cope with it by winding the coil winding with the thin insulating member 8 having a shape along the shoulder portion interposed therebetween. Even in this case, by using the insulating member 8 having a thickness less than or equal to 1 mm, it is possible to attain the above-described effect by rendering coil bobbin-less. Further, by using the insulating member (the insulating sheet) 8 having the ear portion 9 which can be deformed along the shape of the smooth shoulder portion 7 of the tooth portion 4, it is possible to wind the coil winding around the tooth portion 4 with the insulating member 8 interposed therebetween, while deforming the ear portion 9 so as to follow the shape of the shoulder portion 7 of the tooth portion 4. For this reason, it is possible to wind the coil winding while securing quality so as to follow the shape of the shoulder portion 7, regardless of the presence or absence of the insulating member 8.

Furthermore, when the insulating member 8 is configured with the insulating sheet having flexibility and having a shape similar to the planar shape of the electromagnetic steel sheet 5 and the coil winding is wound with the interposition of the insulating member (the insulating sheet) 8, the insulating sheets having a similar shape to the electromagnetic steel sheet 5 are laminated on both ends of the stator core 3 and the coil winding is wound thereon. In this way, it is possible to wind the coil winding so as to follow the shape of the shoulder portion of the tooth portion 4 while bending and deforming the insulating sheet 8 having flexibility so as to follow the shapes of the shoulder portions 7 of the tooth portion 4. For this reason, it is possible to wind the coil winding while securing the quality thereof, without impairing the workability of winding work of the coil winding.

In addition, the present invention is not limited to an invention related to the above-described embodiment, and modifications can be appropriately made within a scope which does not depart from the gist of the present invention. For example, in the above-described embodiment, the number of electromagnetic steel sheets 5 which gradually narrow the circumferential width B of the tooth portion 4 is not particularly defined. However, the number of electromagnetic steel sheets 5 may be appropriately determined by the extent the shoulder portion 7 is made smooth, in consideration of the size of the circumferential width dimension of the tooth portion 4, the sheet thickness of the electromagnetic steel sheet 5, the thickness of the coil winding, or the like, and the number is changed according to the size, the output, and other characteristics of an electric motor.

REFERENCE SIGNS LIST

1: electric motor
3: stator core
4: tooth portion
5: electromagnetic steel sheet
7: shoulder portion
8: insulating member (insulating sheet)
9: ear portion
B: circumferential width of tooth portion

The invention claimed is:

1. A method for producing an electric motor, the electric motor comprising:

a stator core comprising a plurality of laminated annular electromagnetic steel sheets having an annular portion and a plurality of tooth portions on an inner periphery side, and a coil winding wound about each tooth portion, wherein the electromagnetic steel sheet has a continuous plane formed from the annular portion and the tooth portions and wherein the circumferential widths of the tooth portions of the plurality of laminated electromagnetic steel sheets become gradually narrower in width in a stepwise fashion toward an uppermost surface and an undermost surface of the plurality of laminated electromagnetic steel sheets, whereby shoulder portions on both sides in a circumferential direction of the tooth portions smoothly change, the method comprising providing a flexible, planar insulating member having a first portion of a shape similar to the annular portion of said electromagnetic steel sheet and a second portion of a shape similar to the tooth portions, said planar insulating member further comprising flexible ear portions at positions corresponding to the shoulder portions on both sides in the circumferential direction of the tooth portions, and the first portion, the second portion and the ear portion forming a continuous plane, and winding the coil winding around the flexible planar insulating member and the respective tooth portions, including the ear portions of said insulating member interposed between the coil winding and the tooth portion, to thereby deform the flexible ear portions to conform the shape of the shoulder portions.

2. The method according to claim 1, comprising providing said flexible, planar insulating member on the uppermost surface and on the undermost surface of the plurality of laminated electromagnetic steel sheets of the stator.

3. The method according to claim 1, wherein said insulating member is an insulative film.

4. The method according to claim 1, wherein said insulating member has a thickness that is less than or equal to 1 mm.

* * * * *